(12) United States Patent
Hovmark et al.

(10) Patent No.: US 7,797,437 B2
(45) Date of Patent: Sep. 14, 2010

(54) METHOD FOR HANDOVER BETWEEN HETEROGENEOUS COMMUNICATIONS NETWORKS

(75) Inventors: Torbjorn Hovmark, Avesta (SE); Lars Resenius, Bromma (SE)

(73) Assignee: Columbitech AB, Stockholm (SE)

( * ) Notice: Subject to any disclaimer, the term of this patent is extended or adjusted under 35 U.S.C. 154(b) by 1965 days.

(21) Appl. No.: 10/432,547

(22) PCT Filed: Nov. 26, 2001

(86) PCT No.: PCT/SE01/02612

§ 371 (c)(1),
(2), (4) Date: Nov. 3, 2003

(87) PCT Pub. No.: WO02/43348

PCT Pub. Date: May 30, 2002

(65) Prior Publication Data

US 2004/0202128 A1  Oct. 14, 2004

(30) Foreign Application Priority Data

Nov. 24, 2000 (SE) .................. 0004338-0
Feb. 26, 2001 (SE) .................. 1010644-4

(51) Int. Cl.
*G06F 15/16* (2006.01)

(52) U.S. Cl. .................. 709/230; 455/436; 455/428; 455/442; 719/328; 715/749

(58) Field of Classification Search .................. 709/230, 709/231, 234; 370/331; 719/328
See application file for complete search history.

(56) References Cited

U.S. PATENT DOCUMENTS 6,061,346 A   5/2000   Nordman
6,298,060 B1  10/2001  Miyakawa et al.
(Continued)

FOREIGN PATENT DOCUMENTS

EP   0841 831 A2   5/1998
(Continued)

OTHER PUBLICATIONS

International Preliminary Examination Report for PCT/SE01/02612 dated Oct. 21, 2002.
(Continued)

*Primary Examiner*—Saleh Najjar
*Assistant Examiner*—Thuong (Tina) T Nguyen
(74) *Attorney, Agent, or Firm*—Nixon & Vanderhye, PC

(57) ABSTRACT

A method, computer program, and computer readable medium are disclosed for maintaining communication between first and second mobile units communicating via first and second communications networks, respectively. The first and second units include, respectively, first and second protocol stacks and first and second session layers, which interface between the first and second protocol stacks and first and second software components acting within the first and second units, respectively. The first unit includes first communications hardware with associated drive routines for different communications networks. When the first unit switches from a first to a third communications network, the first session layer maintains communication by selecting the first communications hardware and drive routine required for the third communications network. The identities of the first and second units are maintained by the first and second session layers and retained during the first unit's switching of communications networks.

23 Claims, 3 Drawing Sheets

U.S. PATENT DOCUMENTS

| | | | |
|---|---|---|---|
| 6,654,361 B1 * | 11/2003 | Dommety et al. | 370/331 |
| 2001/0032335 A1 * | 10/2001 | Jones | 725/105 |
| 2003/0046394 A1 * | 3/2003 | Goddard et al. | 709/226 |
| 2005/0157677 A1 * | 7/2005 | Dowling | 370/328 |

FOREIGN PATENT DOCUMENTS

| | | |
|---|---|---|
| EP | 0841831 A2 | 5/1998 |
| EP | 1 094 682 A1 | 4/2001 |
| EP | 1094682 A1 | 4/2001 |
| EP | 1 098 540 | 5/2001 |
| JP | 9-292290 | 11/1997 |
| JP | 10-178462 | 6/1998 |
| JP | 2000-083060 | 3/2000 |
| WO | WO 98/47270 | 10/1998 |
| WO | WO 98/47270 A2 | 10/1998 |
| WO | WO 00/02358 | 1/2000 |
| WO | WO 00/02358 A1 | 1/2000 |
| WO | WO00/04733 | 1/2001 |
| WO | WO 02/43348 A1 | 5/2003 |

OTHER PUBLICATIONS

Examiner Office Letter for JP 2002-544946 mailed Jul. 19, 2006 (English and Japanese).

Examiner Office Letter for JP 2002-544946 mailed Apr. 11, 2007 (English and Japanese).

* cited by examiner

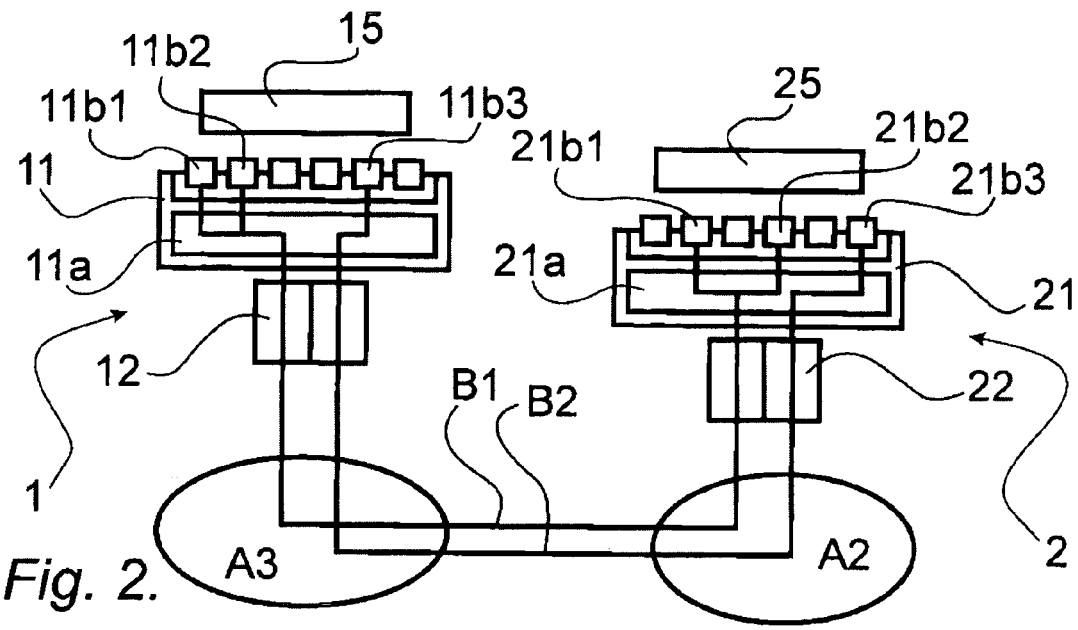
Fig. 2.
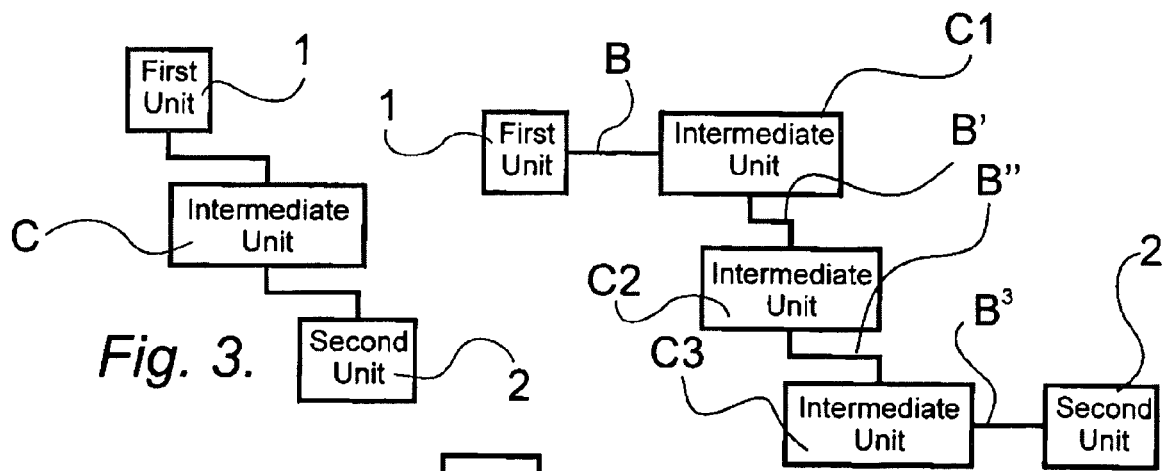
Fig. 3.
Fig. 4.
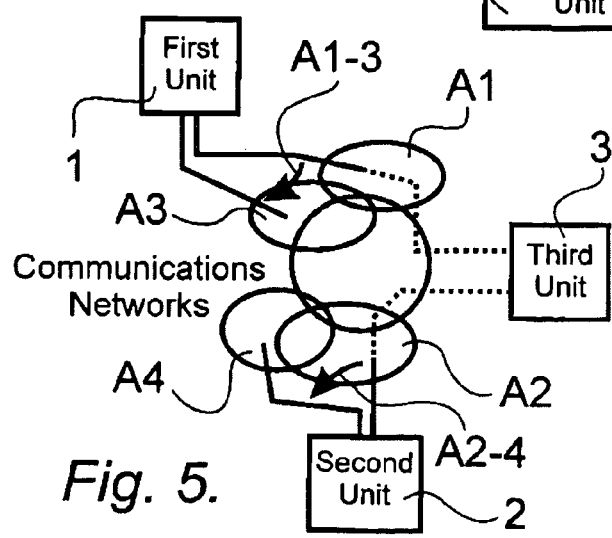
Fig. 5.

METHOD FOR HANDOVER BETWEEN HETEROGENEOUS COMMUNICATIONS NETWORKS

This application is the US national phase of international application PCT/SE01/02612 filed 26 Nov. 2001, which designated the US.

FIELD OF INVENTION

The present invention relates to a method, computer program products, and to a computer readable medium, for handover or roaming between heterogeneous communications networks.

DESCRIPTION OF THE PRIOR ART

Techniques for handover and roaming between homogeneous networks, such as between GSM base-stations have long been in use. Techniques, such as Mobile-IP in combination with IPSec, have also been devised for roaming between networks based on the IP protocol. This technique functions well in IP networks that have homogenous network characteristics, such as in wireless-LAN. It is also known that solutions of this type can become problematic in conjunction with handover between heterogeneous networks having drastically different network characteristics with respect to bandwidth, loss rate or round-trip times.

A number of acronyms and abbreviations are used in this description and in the accompanying Claims for the sake of simplicity. Although these acronyms are conventional to one skilled in this field, an explanation as to their meaning is, nevertheless, given below.

IP—Internet Protocol. TCP—Transmission Control Protocol. UDP—User Datagram Protocol. API—Application Programming Interface. SPI—Service Provider Interface. LAN—Local Area Network. DNS—Domain Name System. ROM—Read Only Memory. WTLS—Wireless Transport Layer Security. SIP—Session Initiation Protocol. NAT—Network Address Translation.

The description and the accompanying Claims also include certain technical terms, a definition of which also given below.

End-to-end security: An encrypted and authenticated tunnel between two software processes where encryption and authentication are such that anyone who is able to listen to traffic and to alter traffic will be unable to read the encrypted information or to change the encrypted information without being detected by the receiver, and where the communication is intended for and is interpreted by said two software processes.

Sessionlayer: Protocol layer acting directly on the transport-protocol layer.

Socket: A terminal point for communication represented by a socket handle in the socket-API.

Handover: Exchange between two different communications links on the same or different networks.

Roaming: Exchange between two different geographically separated communications networks.

SUMMARY OF THE PRESENT INVENTION

Technical problems

A number of problems arise in connection with data communications between a first and a second unit of which at least the first unit is geographically mobile. Normally, it is necessary to cause the communications network to conceal from the second unit the fact that the first unit is mobile. An adaptation of a communications network locks to the use of the communications technology afforded by the communications network, and may also lock to the use of the network operator.

Neither is the software in the first unit always adapted to take into account the fact that the first unit is mobile. This means that the communications hardware in the first unit must be adapted to take into consideration the fact that the first unit is mobile. This creates locking effects to the communications technology supported by the hardware in the first unit.

When communication between the first and the second unit utilises the IP protocol, the second unit uses the IP address of the first unit to address messages from the second unit to the first unit. When the first unit is able to communicate with the second unit via a plurality of different communications links, the first unit will have at least one separate IP address for each communications link. If the first unit now moves in a manner which renders a first used communications link unavailable, the second unit is forced to use a new second communications link to the first unit. This is done by addressing the messages to the IP address of the first unit belonging to the second communications link. However, it is then problematic for the second unit to be aware that the first unit has switched communications links and to know the new IP address that shall now be used.

When the TCP protocol is used on top of the IP protocol and the second communications link has a network characteristic that is different to the first communications link, e.g. a different bandwidth or different round-trip times, it may take a long time for the TCP protocol to adapt to the characteristic of the second network. Subsequent to this switch, the so-called Karns algorithm makes it difficult for the TCP to update its estimate of the mean round-trip time and the standard deviation thereof. Many unnecessary retransmissions or unnecessarily prolonged time-outs are liable to occur during the time taken for the TCP protocol to self-adapt.

Security problems can occur when the second unit is a company server and the first unit switches from one communications link to another. Normally, authentication of the first unit is coupled to the communications link used. When the first unit switches from the first communications link to the second communications link, it is then necessary for the first unit to establish a further authentication over said second communications link.

In conjunction with using a security protocol, data is normally encrypted prior to reaching the link layer This means that the compression functionality acting on the link layer will have no effect, therewith requiring more data to be transported over the communications link.

Methods of creating systems for handover and roaming between communications links in homogenous networks have long been known to the art. In the GSM system, handover and roaming are effected on a special link layer adapted precisely for GSM communication. Data communication over GSM can take place either via circuit switched GSM connections or via GPRS technology. Other mobile telephony systems function in a similar way.

A handover adapted link layer enables handover to be made between base stations and therewith enable communications links to be switched within a network operated by a given operator GSM also provides the possibility of roaming between networks belonging to different operators, although this requires telephone connections to be released and then re-established. Due to the fact that handover in a network that belongs to a individual operator takes place on the link layer, the handover will be concealed from any possible IP layer.

This solves certain of the IP-related problems mentioned above. However, the nature of the solution is such as to prevent it from being transferred on heterogeneous networks that have different types of link layers.

Special telephones that include hardwares and software for several different telephony systems enable roaming between different types of mobile telephony networks to take place, although solely between calls even in this case.

Security in solutions based on mobile telephony systems is normally based on encryption of traffic over the mobile link. This encryption could, in principle, be made arbitrarily strong, although it is often weak in present-day systems. For instance, encryption in GSM is based on the algorithm A5, which can, essentially, be broken in real time. The principle problem with link-based encryption, however, is that it is not used the whole way between the first unit and the second unit, so-called end-to-end encryption. This allows another computer unit to listen to traffic, make changes in the messages, or to use the IP address of the first unit, so-called IP spoofing.

It is also known to use a protocol of the type Mobile-IP for mobility between different IP-based communications links. Mobile-IP is based on special software in the first unit and a first server, called home agent. In some cases, a second server, called foreign agent, is also required in the network. When a foreign agent is used, one foreign agent is normally required for each communications link. Mobile-IP solves the IP address-related problem, by concealing the actual IP address of the first unit and assigning to said unit a second IP address belonging to the first server. The first server forwards all communication received on the second IP address to the IP address used by the first unit at that moment in time. This solves the aforementioned IP address-related problem. However, the problem relating to the TCP protocol is not solved. Moreover, Mobile-IP results in poorer performance, in that it adds further data to each IP packet. Mobile-IP introduces further delays in communication, as a result of so-called triangular routing. These delays are of greater duration when both the first unit and the second unit are mobile. In certain applications, such as in two-way voice communication, these delays are liable to seriously impair the quality of the application.

The protocol IPSec is often used together with Mobile-IP in an attempt to solve security related problems. IPSec is normally used on a level above Mobile-IP. This enable encrypted information to pass through the first server without being decoded, and also obviates the need to establish a new IPSec connection when the first unit switches communications links. The first unit and the second unit are also able to authenticate each other in a secure manner, with the aid of a certificate. However, the IPSec layer works above the link layer, meaning that link layer based compression will not function. Although compression in the IPSec layer is possible, it is difficult or impossible to use state dependent compression algorithms owing to the packet switching nature of IP. This greatly reduces the effect of the compression. Moreover, IPSec necessitates the transmission of extra data with each IP packet. In total, this results in considerably impaired performances.

A new version of the IP protocol, IP version 6 that contains a variant of both IPSec and Mobile-IP has been proposed. One problem with IP version 6 in connection with mobile communication is that the header size on individual messages is larger than in earlier versions of the IP protocol. This results in lower effective bandwidth and longer delays. Furthermore, IP version 6 requires all existing routes to be replaced or upgraded.

In an endeavour to solve the TCP-related problem, various changes to the TCP protocol have been put forward. A proposed alternative involves replacing the existing TCP protocol with a completely new protocol. However, in order to be able to utilise these techniques, it is generally necessary to make changes in both the first unit and the second unit. A general characteristic of these proposals is that they all require changes to the TCP standard, something that would take a very long time to put into effect and to implement in existing computer systems.

The exchange of certain software components in certain types of units, such as Pocket PC-based computer units, is highly complicated owing to the fact that said components are placed in ROM. This makes installation of Mobile-IP software, which shall be executed in or under the TCP/IP stack difficult to carry out.

Also proposed are solutions that exploit an Internet-placed proxy that establishes a TCP connection for the first unit. A proxy-based solution, however, cannot function without terminating the IPSec protocol, as the IPSec protocol encrypts data related to TCP protocol signaling.

Solution

With the intention of solving the aforesaid problems, there is proposed in accordance with the invention a method in which a first unit includes a first session layer, a first protocol stack, one or more hardware. The first session layer includes a first security layer A second unit first communications hardware, and one or more drive routines belonging to said first communications includes a second session layer, a second protocol stack, and one or more second communications hardware. The second session layer includes a second security layer. Each of a plurality of communications networks enables the first unit to send messages to and receive messages from one of the communications hardware belonging to the second unit within a geographical area belonging to said each communications network, by means of one of the first communications hardware.

The first session layer is provided with a first interface that can be used by a plurality of pre-existing first software components based on socket-API. If the first unit is Windows-based, the first interface may be based on WinSock SPI, such as with a Layered Service Provider or a Base Transport Service Provider. If the first unit is PalmOS-based, the first interface may be the same as on the netlib component in PalmOS. The first interface may also be a proxy interface. The proxy interface is assigned the function of listening on certain pre-selected TCP ports and to receive data on certain pre-selected UDP ports on the IP addresses local for the first unit.

If the first interface is a proxy interface, the first unit may include a DNS server which in response to DNS queries from the first software components concerning the IP address belonging to certain pre-selected host names returns a local IP address instead of the correct IP address. Consequently, selected communication will pass through the first session layer. The first session layer can use the port through which it has received data belonging to said communication, the local IP address used, and/or the host name for which a DNS look-up was last made, to decide the destination of said communication.

The second session layer is provided with a second interface that can be used by a plurality of preexisting second software components based on socket API. When the second unit is Windows-based, the second interface may be based on WinSock SPI, such as with a Layered Service Provider or a Base Transport Provider. The second interface may also be based on the TCP protocol and on the UDP protocol.

The first and the second session layer are assigned the task of ensuring that traffic belonging to respective sockets in each of the first software components is corresponded by traffic intended for the second software components and belonging to a unique socket in one of the second software components, and vice versa.

The first unit is connected via a first communications network and the second unit is connected via a second communications network. The first session layer has the function of switching from the first communications network to a third communications network when necessary.

The first session layer is also assigned the task of determining when a switch between communications networks shall take place. This network switch can take place when used communications networks are no longer available, and also for other reasons—such as when a communications network other than that used is considered more suitable for communication, or when criteria based on the cost of using the various communications networks are fulfilled. For instance, a switch can be made when present communication takes place over a circuit switched connection with time-based billing and no information has been sent over the circuit switched connection within a given specified time period. It may then be more advantageous to switch to a packet switched connection with billing based on the amount of transmitted data.

In order to be able to determine which communications networks are available, the first session layer can communicate with the drive routines belonging to the first communications hardwares so as to read-out information that may be of interest in determining the capacity and characteristics of the communications networks, such as signal strength, network availability, and the availability of necessary hardware.

The first and the second session layers are also assigned the task of synchronising the data flows between the first unit and the second unit in conjunction with a switch between two communications networks. This can take place in two different ways, depending on how the switch takes place between said two communications networks. If the first communications network used is still available when the switch to the new, third communications network is made, the first session layer can inform the second session layer, via the first communications network, that the first unit is about to switch networks. The second session layer then ceases to send data over the first communications network and informs the first session layer that it awaits further communication over the third communications network. The first unit may, meanwhile, begin communication via the third communications network. When the second session layer receives communication from the first unit over the third communications network, it can resume communication with the first session layer via the third communications network. This switching between communications networks is referred to as soft handover in the following.

Another way of switching communications networks is required if the first communications network is no longer available when switching to the third communications network takes place or if the first communications network becomes unavailable during a soft handover. The first session layer is then able to inform the second session layer, via the third communications network, of the data received by the first session layer from the second session layer. The second session layer then informs the first session layer of the data received by the second session layer from the first session layer. The first and the second session layers then commence to send data that has not been received by the receiver. Such switching of communications networks is referred to as hard handover in the following text. The above-described message sequences regarding soft handover and hard handover respectively are referred to as handover procedures in the following text.

The first session layer is also assigned the task of stating a first identity for the second unit in respect of overlying protocol layers or applications. The second session layer is assigned the task of stating a second identity for the first unit in respect of overlying protocol layers or applications. These identities shall not be changed when switching between communications networks. When the first and the second security layers are based on WTLS, the identities may be WTLS session identities.

The first session layer is assigned the task of establishing new transport sessions over the third communications network in conjunction with switching to the third communications network. The session layers can maintain one transport session per socket or solely one or a few transport sessions. It is possible to have a first transport session for all sockets that use stream-based communication and a second transport session for all sockets that use datagram-based communication. The first transport session may be based on TCP and the second transport session may be based on UDP.

The first and the second session layers are also assigned the task of compressing traffic from the software components either before or in conjunction with sending said traffic through the first and the second security layers, and to decompress traffic received via the first and second security layers.

If so required, the security layers may be assigned the task of providing an encrypted and authenticated connection between the first and the second unit. The first session layer associates the first identity with each secure connection between the first security layer and the second security layer. The second session layer associates the second identity with each secure connection between the first security layer and the second security layer. The first session layer and the second session layer also associates a unique session with each secure connection between the first security layer and the second security layer.

The first security layer is also assigned the task of re-establishing secure connections over the other communications network after a switch has been made from the first communications network to the third communications network This switch can be made with a complete handshake or with a so-called session resume when the security layers are based on WTLS. In the case of a session resume, the shared secrecy exchanged in an earlier complete handshake is reused. A session resume gives rise to a so-called WTLS connection that has the same session identity as the WTLS connection created with said complete handshake.

The transport sessions can be established between the first unit and the second unit. However, it is also possible to establish the transport sessions between the first unit and an intermediate unit, and between the intermediate unit and the second unit. A plurality of intermediate units may even be chain-connected between the first and the second unit, such that the first unit establishes transport sessions to the first of the intermediate units in the chain, and such that each unit in said chain establishes transport sessions to the next following unit in the chain. The last unit in the chain and the second unit then establish transport sessions between themselves.

When transport sessions are established to the intermediate unit or to a chain of intermediate units, said intermediate unit or some unit in the chain of units can be used to one-time authenticate the first unit. Such authentication can be effected by embedding a one-time password in the handshake procedure between the first security layer and the second security layer. When the first and the second security layers are based on WTLS, the one-time password can be embedded in the client_random field in the client_hello message. Authentication can also be based on the intermediate unit or some unit in the chain verifying a handshake message that includes a signature made with a private key associated with a certificate belonging to the first unit.

The second unit may also be geographically mobile. This second unit may then function in the same way as the first unit.

Should both the first unit and the second unit change communications networks essentially at one and the same time, it may be that the first and the second units both initiate a handover procedure before receiving a handover request from the other party. Two ongoing handover procedures will then exist. The first and the second unit then comply with a rule that determines which of the ongoing handover procedures shall be finalised.

This rule may require the first and the second unit to select the handover procedure that was initiated from the unit that initially created the session.

Should the first unit and the second unit change communication networks essentially at one and the same time and both commence a hard handover it may be that neither the first unit nor the second unit is aware of the new address to the other party involved in the communication. This problem can be solved by communicating via the intermediate unit or via the intermediate chain of units respectively. However, each unit that is a party in said communication will constitute a risk of the messages being delayed. This is unacceptable in certain contexts, for instance in the case of two-way voice communication.

So that the first unit can be located after it has switched communications networks without needing to communicate via the intermediate unit or the chain of units, the first unit sends a message to a third unit in conjunction with initiating a handover procedure. This message contains information relating to the address of the first unit after it has switched networks. If the second unit is mobile or can be thought to be mobile, the first unit also sends to the third unit a request concerning the relevant address of the second unit. The third unit responds with a message that contains the relevant address of the second unit. The message containing own address information and a query concerning the address of the other party may also be combined into a common message. Corresponding procedure is taken by the second unit when it switches communications network via hard handover.

The third unit may be an SIP registrar server or a Mobile-IP Home Agent.

The second unit may be a company internal server, and a firewall may be placed between the first unit and the second unit, such that all communication between the first unit and the second unit must pass through the firewall. When an intermediate unit or a chain of intermediate units is used, one of the intermediate units may be placed in a so-called demilitarised zone belonging to the firewall. The unit in the demilitarised zone may then also be used for authentication of the first computer unit in the aforedescribed way.

A unit used in this way for authentication may conveniently be allocated the function of a pre-coupled means according to Swedish Patent Application No. 00 04338-0 with the title "Data Network Based-System". Such a pre-coupled means operates in a demilitarised zone outside a firewall and has the special function of initiating an authentication procedure such as to establish that a first unit is the unit that it maintains to be, whereafter the authentication procedure between the first unit and the second unit is finalised and a so-called secure session is established between the first and the second unit.

Alternatively, the intermediate unit or one of the units in the chain of intermediate units may consist of the firewall.

It will also be understood that the first unit is able to communicate with several second units and that, similarly, the second unit is able to communicate with several first units.

Advantages

The invention enables a first software in the first unit to retain communication sessions with a second software in the second unit when switching communications networks, despite the first software, the second software, the communications networks and the communications hardware not being designed to retain communication sessions when switching networks.

The invention enables switches to be made between communications networks that have different network characteristics on the basis of different technologies, without needing to rely on the TCP protocol to handle the rapid changes in network characteristics.

The invention also enables switching between communications networks to take place in a secure manner, while retaining end-to-end security.

The invention also enables more effective compression algorithms to be used than what would be the case if compression took place in the IP layer in the protocol stack.

The invention also enables switching of communications networks to take place in the absence of triangular routing.

The invention requires no changes in routers or NAT servers.

The invention requires no changes in the TCP/IP stack of either the first unit or the second unit.

When the second unit is a company internal server, the invention enables communication to take place through a firewall with retained end-to-end security and with authentication outside or in the firewall.

BRIEF DESCRIPTION OF THE DRAWINGS

A method, computer program products, and a computer readable medium having features associated with the present invention will now be described in more detail by way of example and with reference to the accompanying drawings, in which

FIG. 2 is a schematic and highly simplified illustration of how transport sessions are established between a first and a second unit in accordance with the present invention;

FIG. 3 shows how two units can communicate via an intermediate unit;

FIG. 4 shows how two units can communicate via a plurality of intermediate units;

FIG. 5 shows how a third unit can operate to facilitate the possibilities of two units finding each other should an established session be broken for some reason or another;

DESCRIPTION OF EMBODIMENTS AT PRESENT PREFERRED

Figure 1:
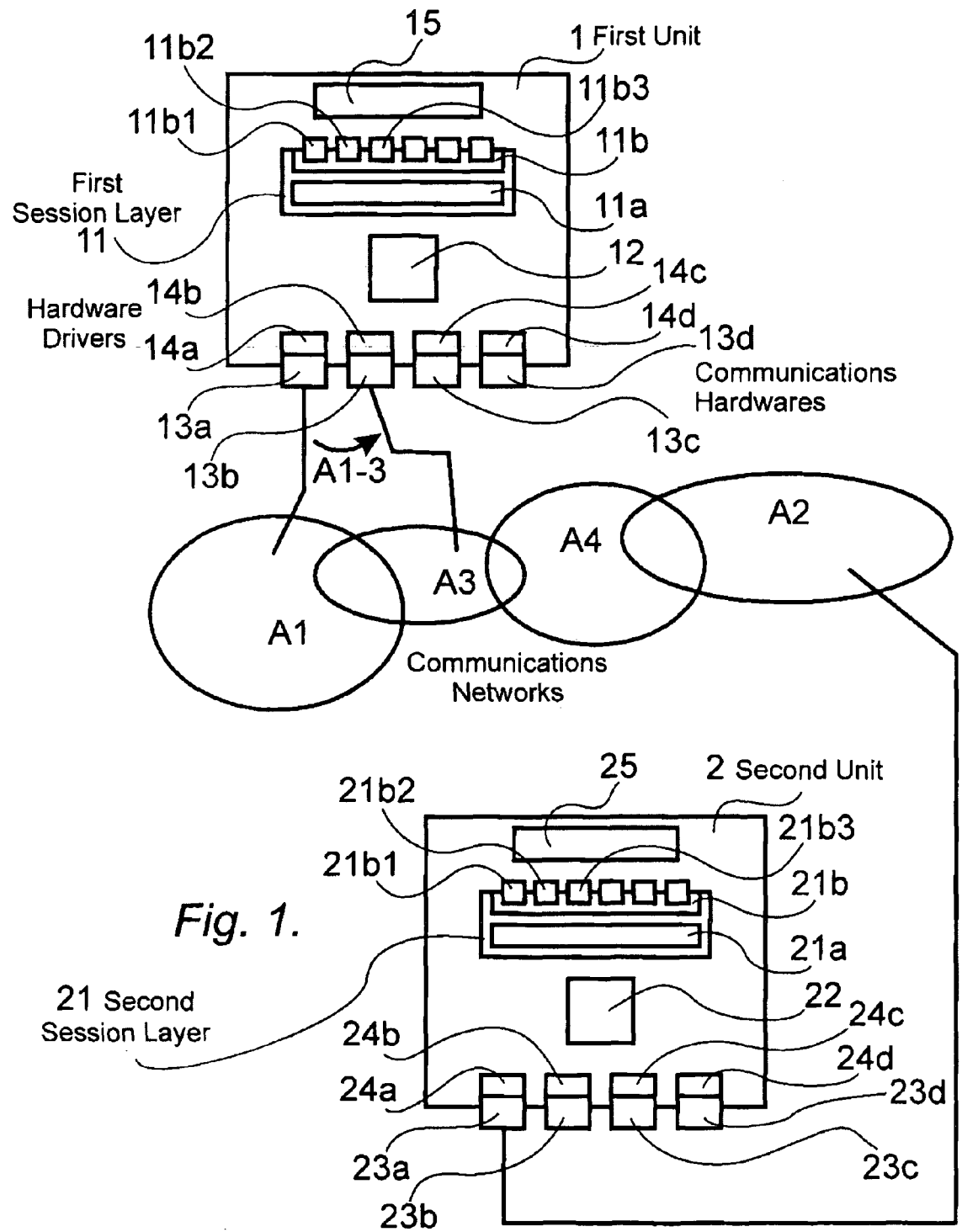
FIG. 1 is a schematic and highly simplified illustration of communication between two units in accordance with the present invention.

FIG. 1 thus illustrates a method wherein a first unit 1 includes a first session layer 11, a first protocol stack 12, one or more first communications hardware 13a, 13b, 13c, 13d and one or more drive routines 14a, 14b, 14c, 14d belonging to the first communications hardwares 13a, 13b, 13c, 13d. The first session layer 11 includes a first security layer 11a.

A second unit 2 includes a second session layer 21, a second protocol stack 22, and one or more second communications hardware 23a, 23b, 23c, 23d. The second session layer 21 includes a second security layer 21a.

Each of a plurality of communications networks A1, A2, A3, A4 enables the first unit 1 to send messages to and receive messages from one of the hardwares 23a, 23b, 23c, 23d belonging to the second unit 2, within a geographical area belonging to each network and with the aid of one of said first communications hardwares 13a, 13b, 13c, 13d.

In one preferred embodiment, the security layers 11a, 21a may be WTLS protocol layers.

The first session layer 11 has a first interface 11b against overlying first software components 15. In one preferred embodiment, the first unit 1 is a windows-based computer unit and the first interface 11b is based on WinSock SPI for a Layered Service Provider.

In an alternative embodiment, the first unit 1 is PalmOS-based, and the first interface 11b is the same as on the netlib component in PalmOS.

In another alternative embodiment, the first unit 1 is Pocket PC-based and the first interface 11b is a proxy interface where the first session layer 11 listens on certain selected TCP ports and binds to certain selected UDP ports and answers with a local IP address to DNS queries from the first software components 15.

The second session layer 21 has a second interface 21b against overlying second software components 25. In one preferred embodiment, the second unit 2 is a Windows-based computer unit and the second interface 21b is based on WinSock SPI for a Layered Service Provider.

The first and the second session layer 11, 21 use a common session protocol to ensure that for each of the first sockets 11b1, 11b2, 11b3 created by the first software components 15 in the first interface 11b there are created corresponding second sockets 21b1, 21b2, 21b3 in the second interface 21b, and that subsequent traffic belonging to each of the said first sockets 11b1, 11b2, 11b3 is corresponded by the traffic intended for the second software components 25 and belonging to intended unique second sockets 21b1, 21b2, 21b3, and vice versa. When a socket is stream-based, the session protocol ensures that all traffic will arrive in the correct order and that no traffic will be excluded.

The first unit 1 is connected via a first communications network A1, and the second unit 2 is connected via a second communications network A2. The first session layer 11 is assigned the task of switching A1-3 from the first communications network A1 to a third communications network A3 when necessary, and to decide when this network switch shall take place.

According to one preferred embodiment, the A1-3 switch shall be made when the first network A1 is no longer available. The switch may also be made when the third network A3 becomes available and is considered more suitable for communication than the first communications network A1 in accordance with a pre-decided order. The switch shall also be made to a packet switched communications network with billing based on the amount of transferred data when such a network is available and when the first communications network A1 is circuit switched and has time-based billing and no information has been sent over the circuit switched first communications network A1 within a given specified time period.

According to a preferred embodiment, the first session layer 11 shall communicate with the drive routines 14a, 14b, 14c, 14d so as to be able to decide which communications networks A1, A2, A3, A4 are/is available. When the drive routines are able to determine on each occasion those communication networks that are available, this information is used. When the drive routines are unable to determine which communications networks are available but, on the other hand, are able to measure the strength of signals arriving at a base station belonging to the communications networks, the first session layer 11 assumes that a communications network is available when the signal strength lies above a preselected selected threshold. When the drive routine 14a, 14b, 14c, 14d is able to determine whether the communications hardware 13a, 13b, 13c, 13d is available or not, it is assumed that a network is not available when the hardware belonging to said network is unavailable.

In the switch A1-3 illustrated in FIG. 1, the switch from the network A1 to the network A3 also causes a switch of communications hardware 13b and associated drive routine 14b. It will be understood, however, that this need not be the case and that a network switch can be effected without requiring a change of hardware and drive routine to be made.

The first and the second session layers 11, 21 are also assigned the task of synchronising the data streams between the first unit 1 and the second unit 2 with the aid of the session protocol, in conjunction with a switch A1-3 between two networks A1, A3. This can be effected in two different ways, depending on how the switch between said two communications networks shall take place.

If the first communications network A1 used is still available when the switch is made to the new third communications network A3, the first session layer 11 may inform the second session layer 21 over the first communications network A1 that the first unit 1 is in the process of switching networks. The second session layer 21 then breaks off further transmission of data over the first communications network A1 and informs the first session layer 11 that it awaits further communication over the third communications network A3. Meanwhile, the first unit 1 can commence communication over the third communications network A3. When the second session layer 21 receives communication from the first session layer 11 over the third network A3, it can resume communication with the first session layer 11 over the third network A3. Such switching of communications networks is referred to hereinafter as soft handover.

An alternative method of switching communications networks is used if the first communications network A1 is no longer available when handover to the third communications network A3 takes place. The first session layer 11 can then inform the second session layer 21, via the third network A3, of the data received by the first session layer 11 from the second session layer 21. The second session layer 21 then informs the first session layer 11 of the data received by the second session layer 21 from the first session layer 11. The first and the second session layers 11, 21 then begin to send data that has not been received by the receiver. Such switching between communications networks is referred to hereinafter as hard handover.

The aforesaid message sequences for soft handover and hard handover respectively are referred to hereinafter as a handover procedure.

According to a preferred embodiment, soft handover shall be employed when the first communications network A1 is still available when initiating a C communications network switching process. A hard handover shall be employed in other cases. If a soft handover has been initiated, but not finalised, and the first session layer 11 detects that the first communications network A1 is no longer available, the first session layer 11 shall initiate a hard handover.

The first session layer 11 is also assigned the task of stating a first identity for the second unit 2 for overlying protocol layers and programs 15. The second session layer 21 is assigned the task of stating a second identity for the first unit 1 in respect of overlying protocol layers and programs 25.

According to a preferred embodiment, these identities may be WTLS session identities. An abbreviated WTLS handshake is made in connection with a communications network switch, between the first security layer 11a and the second security layer 21a, a so-called WTLS session resume. WTLS session identities will therewith remain unchanged in connection with the network switch and can therefore be used by the first and the second session layers 11, 21 instead of IP addresses as a unique and unchanged machine identity.

FIG. 2 is a schematic and highly simplified illustration which shows that the first session layer 11 is assigned the task of establishing new transport sessions B1, B2 over the third communications network A3 in connection with switching to the third communications network A3.

In one preferred embodiment, the session layers 11, 21 shall establish two transport sessions B1, B2 between themselves. A first transport session B1 shall be based on the TCP protocol and used to transfer data for all first sockets 11b1, 11b2 that have been created for stream-based communication. A second transport session B2 shall be based on the UDP protocol and used to transfer for all other sockets 11b3 that have been created for datagram-based communication.

In an alternative embodiment, the first transport session B1 may be based on different protocols depending on the characteristics of the first and the third communications networks A1 and A3 respectively.

The first and the second session layers 11, 21 compress traffic from the software components 15, 25 either before or in conjunction with forwarding the traffic through the security layers 11a, 21a. The first and the second session layers 11, 21 also decompress traffic that has been received through the security layers 11a, 21a.

In one preferred embodiment, there is used a state-dependent compression algorithm that has one state for each stream-based socket and traffic direction. According to one alternative embodiment, there is used a state-dependent compression algorithm that has one state for each traffic direction and receiver.

The security layers 11a, 21a are assigned the task of providing an encrypted and authenticated connection between the first and the second unit 1, 2. The first session layer 11 associates the first identity with each secure connection between the first security layer 11a and the second security layer 21a. The second session layer 21 associates the second identity with each secure connection between the first, security layer 11a and the second security layer 21a. The first session layer 11 and the second session layer 21 also associate a unique session with each secure connection between the first security layer 11a and the second security layer 21a.

According to one embodiment, the transport sessions B1, B2 are established directly between the first and the second units 1, 2.

FIG. 3 illustrates a preferred embodiment in which the transport sessions B are established from the first unit 1 to an intermediate unit C and between the second unit 2 and the intermediate unit C. The intermediate unit C forwards data between the first and the second units 1, 2 via the transport sessions B.

FIG. 4 illustrates an alternative embodiment in which a plurality of intermediate units C1, C2, C3 are chain connected and the transport sessions B are established from the first unit 1 to the first of the intermediate units C1 in said chain and the transport sessions B3 from the second unit 2 are established to the last unit C3 in the chain of said Intermediate units. Transport sessions B', B" from the chain units C1, C2 are also established to the next following unit in the chain. Traffic from the first unit 1 is forwarded through the chain to the second unit 2 and traffic from the second unit 2 is forwarded through the chain to the first unit 1 in the reverse direction.

When transport sessions B are established to the intermediate unit C, the intermediate unit C or some other unit in the chain of intermediate units C1, C2, C3 can be used to authenticate the first unit 1.

In one preferred embodiment authentication is effected by checking the certificate_verify message in the complete WTLS handshake. In an alternative embodiment authentication is effected by checking a one-time password embedded in the client_random field in the client_hello message in the complete WTLS handshake or in all WTLS handshakes.

In one embodiment the second unit 2 may be allowed to be geographically mobile. This mobile unit functions in the same way as the first unit 1. Should both the first unit 1 and the second unit 2 switch communications networks essentially simultaneously, it may be that the first and the second unit 1, 2 both initiate a handover procedure before they receive a message to the effect that a handover procedure has been initiated from the other party. Two handover procedures will then be ongoing. The first and the second units 1, 2 will then apply a rule that decides which of the ongoing handover procedures shall be finalised.

In a preferred embodiment, the first and the second units 1, 2 choose the handover procedure that has been initiated by the unit that initiated the communications session.

FIG. 5 illustrates an embodiment in which the first unit 1 is able to send a message to a third unit 3 in conjunction with initiation of a handover procedure for switching A1-3 from a first communications network A1 to a third communications network A3. This message includes information relating to the address of the first unit after said unit has switched to another network. The message from the first unit 1 may also include a request for the relevant address of the second unit 2. In reply to this request, the third unit 3 sends to the first unit 1 a message containing the relevant address of the second unit 2. In an alternative embodiment the request for the relevant address of the second unit 2 may be sent in a message which is separate from the message containing the relevant address of the first unit. If the second unit 2 switches A2-4 from the second communications network A2 to a fourth communications network A4, a corresponding procedure is followed.

This enables the first and second units 1, 2 to find each other should they lose each other's address as a result of both units initiating a handover procedure with a hard handover at one and the same time.

According to one embodiment, the third unit 3 shall be a unit which is dedicated to keep an account of the relevant addresses of geographically mobile units. In an alternative embodiment, the third unit 3 may be an SIP registrar server. According to another alternative embodiment, the third unit 3 may be a Mobile-IP Home Agent.

Figure 6:
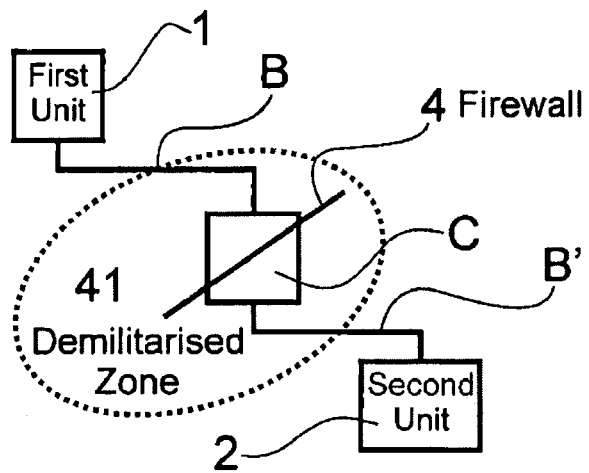
FIG. 6 shows how an intermediate unit can be assigned the function of a firewall.

FIG. 6 illustrates another preferred embodiment in which the second unit 2 may be a company internal server, and in which a firewall 4 may be placed between the first unit 1 and the second unit 2 in a manner such that all traffic between the first unit 1 and the second unit 2 must pass through said firewall 4.

According to this embodiment, an intermediate unit C may be placed in a so-called demilitarised zone 41 belonging to the firewall 4. Moreover, the transport sessions B' between the second unit 2 and the intermediate unit C shall be established on the initiative of the second unit 2. Furthermore, the intermediate unit C shall be used to authenticate the first unit 1 in the aforedescribed manner.

Figure 7:
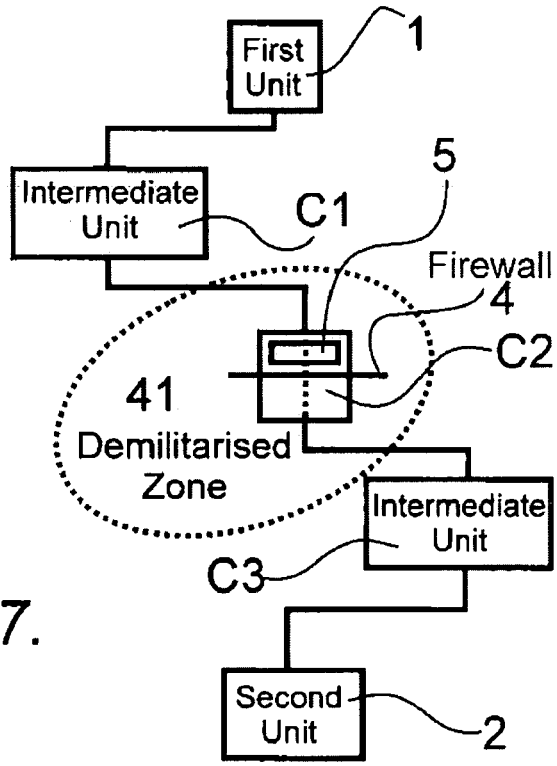
FIG. 7 shows how an intermediate unit, which is one of several intermediate units, can be allocated the function of a firewall.

According to an alternative embodiment, the firewall 4 may consist of the intermediate unit C. According to yet another alternative embodiment, shown in FIG. 7, a chain of intermediate units C1, C2, C3 can be used, wherewith one of the units in said chain (exemplified as the intermediate unit C2 in the Figure) is placed in a demilitarised zone 41 belonging to the firewall 4, where said unit C2 may also constitute the firewall 4.

The unit acting in the demilitarised zone 41 may also be given the function of a pre-coupled means 5 according to Swedish Patent Application 00 04338-0 for handling authentication of a unit located outside the firewall and desiring to communicate with a unit inside the firewall.

The pre-coupled means 5 will not be described in any detail in this document, and the reader is referred to the aforesaid Swedish Patent Application for a more detailed description of said means.

Figure 8:
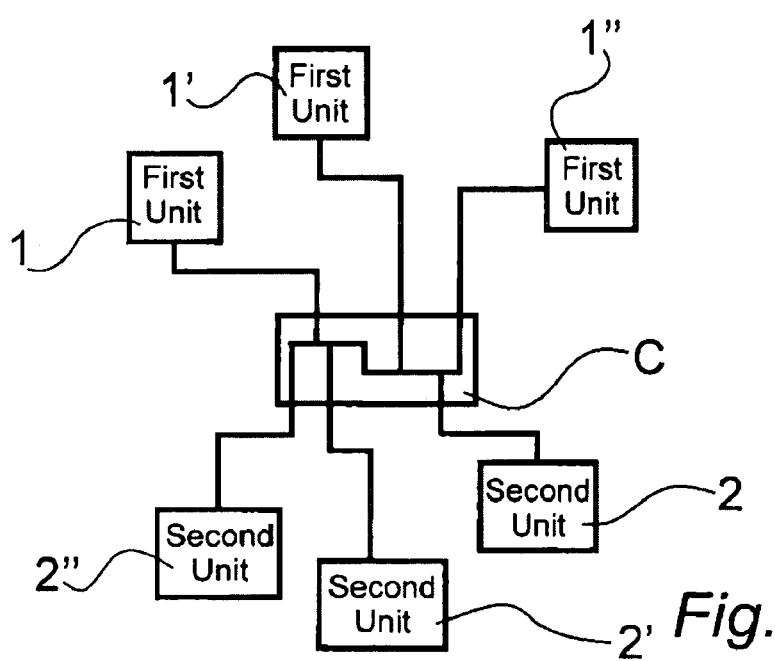
FIG. 8 shows how a plurality of units can communicate with each other in accordance with the present invention.

FIG. 8 shows an example of how the first unit 1 may be adapted to communicate with several second units 2, 2', 2" via the intermediate unity and how each of said second units 2, 2', 2" may be adapted to communicate with several first units 1, 1', 1". The first units 1, 1', 1" and the second units 2, 2', 2" then proceed in the same way in relation to each of the second units and each of the first units respectively as described above.

It will be understood that the invention is not restricted to the aforedescribed and illustrated exemplifying embodiments thereof and that modifications can be made within the concept of the invention as illustrated in the accompanying Claims.

The invention claimed is:

1. A method of maintaining communication between a first unit and a second unit, wherein said first unit is comprised of a geographically mobile unit and includes a first protocol stack adapted to act between a first communications hardware used for communication via a first communications network and one or more first software components, and wherein said second unit includes a second protocol stack adapted to act between a second communications hardware used for communication via a second communications network and one or more second software components, the method comprising the steps of:

providing said first unit with a first session layer which is adapted to act as an interface between said first protocol stack and said first software components;

providing said second unit with a second session layer which is adapted to act as an interface between said second protocol stack and said second software components;

causing said first session layer to indicate a first identity corresponding to said second unit and said second software components;

causing said second session layer to indicate a second identity corresponding to said first unit and said first software components;

causing said first and said second session layers to use a common session protocol to ensure that traffic belonging to different first sockets in said first software components are directed by traffic intended for said second software components to different second sockets in said second software components uniquely corresponding to said different first sockets, and that traffic belonging to different second sockets in said second software components are directed by traffic intended for said first software components to different first sockets in said first software components uniquely corresponding to said different second sockets;

providing said first unit with one or more first communications hardware with associated drive routines adapted to different communications networks;

in the event of said first unit switching from said first communications network to a third communications network, causing said first session layer to maintain said communication between said first unit and said second unit by selecting necessary first communications hardware and drive routines for said third communications network; and causing said second session layer to retain said second identity during the switching of said first unit from said first communications network to said third communications network.

2. A method according to claim 1, wherein said first session layer determines when a change of communications network is necessary; and wherein said first session layer controls said communications network switching procedure while maintaining communication with said second unit.

3. A method according to claim 2, wherein said first session layer communicates, either continuously or periodically, with the drive routines belonging to said communications hardwares so as thereby to read information concerning the capacities and characteristics of different communications networks, such as signal strength, network availability and also the availability of requisite communications hardware.

4. A method according to claim 2, wherein said first and said second session layers are adapted to synchronise the data streams between said first and said second units in conjunction with switching said first communications network to another network.

5. A method according to claim 4, in which said first communications network is available during the entire switching process, wherein the first session layer informs the second session layer, via said first communications network, that said first unit is in the process of switching communications networks; said second session layer then informs said first session layer, via said first communications network, that further communication via said first communications network will be stopped; said second session layer ceases to send data via said first communications network; said first session layer then commences communication via said third communications network; and said second session layer then resumes communication with said first session layer via said third communications network.

6. A method according to claim 5, wherein said first session layer establishes new transport sessions over said third communications network in conjunction with switching of the networks.

7. A method according to claim 6, wherein said session layer maintains a transport session for each socket, or solely one or a plurality of transport sessions.

8. A method according to claim 7, wherein a first transport session is maintained for all sockets that use stream-based communication, said first transport session being based, for example, on TCP; and in that a second transport session is maintained for all sockets that use datagram-based communication, said second transport session being based, for example, on UDP.

9. A method according to claim 4, in which said first communications network is unavailable for some reason, or becomes unavailable during a network switch, wherein the first session layer informs the second session layer, via said third communications network, as to which data said first session layer has received from the second session layer; the second session layer then informs the first session layer of the data that the second session layer has received from said first session layer; and said first and said second session layers then commence to send, via said third communications network, data that has not previously been received by the receiver.

10. A method according to claim 1, wherein said first session layer includes a first security layer; and in that said second session layer includes a second security layer.

11. A method according to claim 10, wherein said first and said second security layers are based on WTLS; and in that said identities are WTLS session identities.

12. A method according to claim 11, wherein said re-establishment is effected by means of a Wireless Transport Layer Security session resume.

13. A method according to claim 10, wherein said first and said second security layers provide an encrypted and authenticated connection between the first and the second units; and in that said first and second security layers re-establish said security connection subsequent to switching from one communications network to another.

14. A method according to claim 13, wherein said re-establishment is effected by means of a complete handshake.

15. A method according to claim 1, wherein said first unit communicates with a plurality of second units simultaneously.

16. A method according to claim 1, wherein said second unit is also comprised of a geographically mobile unit; and in that said second unit and said second session layer are similar to said first unit and said first session layer, respectively.

17. A method according to claim 16, wherein when both said first and said second unit manage to initiate a switch of communications networks with a message sequence prior to receiving a message from the other party that a switch between networks has been initiated generally simultaneously, a common rule determines which message sequence shall be pursued, for instance the message sequence which was begun by the unit that initially created the communications session is pursued while the other message sequence is stopped.

18. A method according to claim 17, wherein said first unit carries out a switch of networks, in that said first unit informs a third unit of its new IP address in conjunction with said communications network switch; and in that said second unit can obtain said new IP address from said third unit.

19. A method according to claim 18, wherein said third unit is an SIP registrar server.

20. A method according to claim 18, wherein said third unit is a Mobile-IP Home Agent.

21. A method according to claim 18, wherein said second unit also carries out a network switch, in that said second unit also informs said third unit of its new IP address in conjunction with making said communications network switch; and in that said first unit can obtain said new IP address from said third unit.

22. A first computer readable medium having stored thereon a first computer program with a first computer program code, which, when executed by a first computer unit that comprises the first unit recited in claim 1, performs the functions of the first session layer recited in claim 1.

23. A second computer readable medium having stored thereon a second computer program with a second computer program code which, when executed by a second computer unit that comprises the second unit recited in claim 1, performs the functions of the second session layer recited in claim 1.

* * * * *